United States Patent
Das et al.

(10) Patent No.: US 11,151,252 B2
(45) Date of Patent: Oct. 19, 2021

(54) JUST IN TIME MEMORY ANALYSIS FOR MALWARE DETECTION

(71) Applicant: SonicWALL Inc., Santa Clara, CA (US)

(72) Inventors: Soumyadipta Das, Santa Clara, CA (US); Alex Dubrovsky, Santa Clara, CA (US); Igor Korsunsky, Santa Clara, CA (US)

(73) Assignee: SONICWALL INC., Milpitas, CA (US)

( * ) Notice: Subject to any disclaimer, the term of this patent is extended or adjusted under 35 U.S.C. 154(b) by 136 days.

(21) Appl. No.: 15/783,793

(22) Filed: Oct. 13, 2017

(65) Prior Publication Data

US 2019/0114421 A1    Apr. 18, 2019

(51) Int. Cl.
  *G06F 21/00*   (2013.01)
  *G06F 21/56*   (2013.01)
(52) U.S. Cl.
  CPC ...... *G06F 21/566* (2013.01); *G06F 2221/034* (2013.01); *G06F 2221/2125* (2013.01)
(58) Field of Classification Search
  CPC ...... G06F 21/566; G06F 21/56; G06F 21/561; G06F 21/53; H04L 63/1425; H04L 63/1416; H04L 63/1433; H04L 63/145
  See application file for complete search history.

(56) References Cited

U.S. PATENT DOCUMENTS

| | | | |
|---|---|---|---|
| 6,154,844 A | 11/2000 | Touboul et al. | |
| 6,804,780 B1 | 10/2004 | Touboul | |
| 6,965,968 B1 | 11/2005 | Touboul | |
| 7,058,822 B2 | 6/2006 | Edery et al. | |
| 7,523,502 B1 | 4/2009 | Kennedy et al. | |
| 7,613,926 B2 | 11/2009 | Edery et al. | |
| 7,647,633 B2 | 1/2010 | Edery et al. | |
| 7,962,959 B1 | 6/2011 | Batenin | |

(Continued)

FOREIGN PATENT DOCUMENTS

| EP | 3 732 571 | 11/2020 |
|---|---|---|
| GB | 2553033 | 2/2018 |

(Continued)

OTHER PUBLICATIONS

Nethercote NPL: obtained from Google Search (Year: 2004).*

(Continued)

*Primary Examiner* — Tri M Tran
(74) *Attorney, Agent, or Firm* — Polsinelli LLP

(57) ABSTRACT

Methods and apparatus consistent with the present disclosure may use instrumentation code that remains transparent to an application program that the instrumentation code has been injected into. In certain instances, data sets that include executable code may be received via packetized communications or be received via other means, such as, receiving a file from a data store. The present technique allows a processor executing instrumentation code to monitor actions performed by the program code included in a received data set. Malware may be detected by scanning suspect program code with a malware scanner, malware may be detected by identifying suspicious actions performed by a set of program code, or malware may be detected by a combination of such techniques.

21 Claims, 7 Drawing Sheets

(56) References Cited

U.S. PATENT DOCUMENTS

| | | |
|---|---|---|
| 7,971,255 B1 | 6/2011 | Kc et al. |
| 7,975,305 B2 | 7/2011 | Rubin et al. |
| 8,104,089 B1 | 1/2012 | Guo et al. |
| 8,141,154 B2 | 3/2012 | Gruzman et al. |
| 8,146,151 B2 | 3/2012 | Hulten et al. |
| 8,225,408 B2 | 7/2012 | Rubin et al. |
| 8,276,202 B1 | 9/2012 | Dubrovsky et al. |
| 8,307,432 B1 | 11/2012 | Feng |
| 8,413,235 B1 | 4/2013 | Chen et al. |
| 8,539,578 B1 | 9/2013 | Zhou et al. |
| 8,595,829 B1 * | 11/2013 | Kane .................. G06F 21/552 726/22 |
| 8,645,923 B1 | 2/2014 | Satish et al. |
| 8,677,494 B2 | 3/2014 | Edery et al. |
| 8,832,836 B2 | 9/2014 | Thomas et al. |
| 8,910,238 B2 | 12/2014 | Lukacs et al. |
| 9,141,794 B1 | 9/2015 | Soubramanien et al. |
| 9,202,048 B2 | 12/2015 | Sallam |
| 9,411,953 B1 | 8/2016 | Kane et al. |
| 9,516,055 B1 * | 12/2016 | Liu ..................... G06F 21/566 |
| 9,836,604 B2 | 12/2017 | Coronado et al. |
| 9,990,497 B2 | 6/2018 | Spernow et al. |
| 10,685,110 B2 | 6/2020 | Das |
| 10,873,589 B2 | 12/2020 | Cheetancheri |
| 10,902,122 B2 | 1/2021 | Das |
| 2002/0009079 A1 | 1/2002 | Jungck et al. |
| 2003/0033542 A1 | 2/2003 | Goseva-Popstojanova et al. |
| 2006/0224724 A1 | 10/2006 | Marinescu et al. |
| 2007/0157203 A1 | 7/2007 | Lim |
| 2007/0261112 A1 | 11/2007 | Todd et al. |
| 2008/0016339 A1 * | 1/2008 | Shukla ................ G06F 21/566 713/164 |
| 2009/0070876 A1 | 3/2009 | Kim et al. |
| 2010/0185876 A1 | 7/2010 | Kim |
| 2010/0269171 A1 | 10/2010 | Raz et al. |
| 2011/0047620 A1 | 2/2011 | Mahaffey et al. |
| 2011/0078794 A1 * | 3/2011 | Manni .................. G06F 21/566 726/23 |
| 2011/0277033 A1 * | 11/2011 | Ramchetty ............ G06F 21/564 726/24 |
| 2012/0266243 A1 | 10/2012 | Turkulainen |
| 2013/0080625 A1 | 3/2013 | Morinaga et al. |
| 2013/0091584 A1 | 4/2013 | Liebmann et al. |
| 2014/0181976 A1 | 6/2014 | Snow et al. |
| 2014/0208426 A1 | 7/2014 | Natarajan et al. |
| 2014/0215621 A1 * | 7/2014 | Xaypanya ............ H04L 63/145 726/23 |
| 2015/0089651 A1 | 3/2015 | Mirski et al. |
| 2015/0096018 A1 | 4/2015 | Mircescu |
| 2015/0096022 A1 * | 4/2015 | Vincent ................. G06F 21/566 726/23 |
| 2015/0227742 A1 | 8/2015 | Pereira |
| 2016/0098560 A1 | 4/2016 | Friedrichs et al. |
| 2016/0099963 A1 | 4/2016 | Mahaffey et al. |
| 2016/0357958 A1 | 12/2016 | Guidry |
| 2016/0378640 A1 * | 12/2016 | Hron ........................ G06F 8/52 717/130 |
| 2017/0171240 A1 | 6/2017 | Arzi et al. |
| 2017/0289176 A1 | 10/2017 | Chen et al. |
| 2017/0329621 A1 | 11/2017 | Beckett |
| 2018/0018459 A1 * | 1/2018 | Zhang .................. G06F 21/554 |
| 2019/0052651 A1 | 2/2019 | Cheetancheri |
| 2019/0065740 A1 | 2/2019 | van Riel et al. |
| 2019/0114421 A1 | 4/2019 | Das |
| 2019/0205537 A1 | 7/2019 | Das |
| 2019/0236275 A1 | 8/2019 | Das |
| 2019/0342313 A1 | 11/2019 | Watkiss et al. |
| 2019/0347413 A1 | 11/2019 | Dubrovsky et al. |
| 2020/0380127 A1 | 12/2020 | Das |

FOREIGN PATENT DOCUMENTS

| | | |
|---|---|---|
| WO | WO 2019/032702 | 2/2019 |
| WO | WO 2019/075388 | 4/2019 |
| WO | WO 2019/133637 | 7/2019 |
| WO | WO 2019/222261 | 11/2019 |

OTHER PUBLICATIONS

PCT Application No. PCT/US2018/055694 International Search Report and Written Opinion dated Feb. 11, 2019.
U.S. Appl. No. 15/671,445 Office Action dated Feb. 25, 2019.
U.S. Appl. No. 15/671,445, Senthil Cheetancheri, Real-Time Prevention Malicious Content via Dynamic Analysis, Aug. 8, 2017.
PCT/US18/45814, Real-Time Prevention Malicious Content via Dynamic Analysis, Aug. 8, 2018.
PCT/US18/55694, Just in Time Memory Analysis for Malware Detections, Oct. 12, 2018.
U.S. Appl. No. 15/858,785, Soumyadipta Das, Detection of Exploitative Program Code, Dec. 29, 2017.
U.S. Appl. No. 15/890,192, Soumyadipta Das, Just in Time Memory Analysis for Malware Detection, Feb. 6, 2018.
U.S. Appl. No. 16/055,958, Aleksandr Dubrovsky, Cloud Based Just in Time Memory Analysis for Malware Detection, Aug. 6, 2018.
PCT Application No. PCT/US2018/067541 International Search Report and Written Opinion dated Mar. 27, 2019.
PCT/US19/32283, Cloud Based Just in Time Memory Analysis for Malware Detection, May 14, 2019.
PCT Application No. PCT/US2019/032283 International Search Report and Written Opinion dated Sep. 12, 2019.
U.S. Appl. No. 15/671,445 Final Office Action dated Aug. 15, 2019.
U.S. Appl. No. 15/858,785 Office Action dated Sep. 6, 2019.
U.S. Appl. No. 15/890,192 Office Action dated Oct. 4, 2019.
U.S. Appl. No. 15/890,192 Final Office Action dated Jan. 21, 2020.
U.S. Appl. No. 16/903,060, Soumyadipta Das, Detection of Exploitative Program Code, Jun. 16, 2020.
Software Instrumentation, Wiley Encyclopedia of Computer Science and Engineering, edited by Benjamin Wah. Copyright 2008 John Wiley & Sons, Inc.
PCT Application No. PCT/US2018/055694 International Preliminary Report on Patentability dated Apr. 14, 2020.
U.S. Appl. No. 15/671,445 Office Action dated May 14, 2020.
U.S. Appl. No. 15/890,192 Office Action dated Jun. 11, 2020.
U.S. Appl. No. 16/055,958 Office Action dated Apr. 21, 2020.
PCT Application No. PCT/US2019/032283 International Preliminary Report on Patentability dated Nov. 17, 2020; 9 pages.
U.S. Appl. No. 17/128,639, Senthill Cheetancheri, Real-Time Prevention of Malicious Content via Dynamic Analysis, Dec. 21, 2020.
PCT Application No. PCT/US2018/045814 International Preliminary Report on Patentability dated Feb. 11, 2020.
PCT Application No. PCT/US2018/067541 International Preliminary Report on Patentability dated Jun. 30, 2020.
U.S. Appl. No. 16/055,958 Final Office Action dated Oct. 9, 2020.
"XOR Cipher—Wikipedia", Mar. 19, 2017, XP055758581, Retrieved from the Internet: URL:https://en.wikipedia.org/w/index.php?title=XOR_cipher&oldid=771112755 [retrieved on Dec. 9, 2020].
European Application No. 18844091.1 Extended European Search Report dated Jan. 19, 2021.
U.S. Appl. No. 16/055,958 Office Action dated Mar. 25, 2021.
PCT Application No. PCT/US2018/045814 International Search Report and Written Opinion dated Oct. 19, 2018.
European Application No. 18894474.8 Extended European Search Report dated Aug. 3, 2021.

* cited by examiner

JUST IN TIME MEMORY ANALYSIS FOR MALWARE DETECTION

BACKGROUND OF THE INVENTION

Field of Invention

The present invention generally relates to identifying whether computer data includes malicious content. More specifically, the present invention relates to identifying whether malware is included in one or more data packets transmitted from a first computer to a second computer or is included computer data stored in a memory.

Description of the Related Art

One of the greatest threats to privacy and to secure computer data are various sorts of computer malware, such as computer viruses or eavesdropping software. Generally malware can be any software program that includes code that executes without the knowledge or authorization of an owner or user of a computing device.

Malware are typically distributed by parties with nefarious intent. Malware is commonly used steal or destroy computer data or to snoop or spy the actions of a user when the user operates a computer. Malware is also frequently used to damage a computer or to damage computer data. For example malware may be used to steal personal or financial information, blackmail computer users by denying access to their own data unless or until a fee is paid, or to damage infected computers by damaging data stored on those infected computers. Malware can reside in sets of data packets transferred between computers or can reside in a data storage device in the form of a file, for example.

Furthermore, newly developed malware is increasingly difficult to identify. Frequently, until a particular sort of malware has been identified and characterized, conventional techniques that identify whether a communication includes malware can miss detecting the presence of that malware in the communication. This may occur when information in one or more received data packets is hidden or when the malware is not identifiable by a signature associated with the information in the received data packets.

Presently thousands of new malware samples are discovered all over the internet each day. According to the popular malware detection website Virustotal.com, an average number of unique malware samples identified daily are above 800,000. This huge number of malware samples traversing the internet poses a significant challenge for detection using known pattern matching methods employed by traditional anti-malware solutions.

Significantly, almost all the new malware samples we observe each day are actually repackaged versions of known malware. Individuals that generate malware today often obfuscate the presence of malicious code by packing it within other executable code or by compressing it. In certain instances this is performed using binary packing software or a form of software that is referred to as "protector" software. This packing or "protecting" function may reorganize or manipulate a piece of original malware code into a structure that cannot be detected using conventional packet scanning. As such, repackaged versions of old malware successfully evade detection when conventional scanning techniques such as deep packet inspection (DPI) are used. DPI relies on pattern matching data included in a set of data packets with attributes associated with or signatures generated from previously identified malicious code.

When a repackaged malware is received and is executed by a computing device, that malware reveals (unpacks) its internal malicious code and associated data in process memory where the malicious code is then executed by a processor at the computing device. The difficulty in detecting repackaged malware is compounded by the fact that memory extraction of code and data does not generate any operating system events, such as a system call or call-backs which can be intercepted externally. Hence malicious code can silently be extracted, executed and removed from memory.

Since malware can and is used by those to steal or destroy computer data and since repackaged malware can avoid detection when conventional techniques are used, what are needed are detection methods that do not depend on the content of a set of computer data.

Another conventional approach for identifying actions performed by a processor executing instructions out of a memory involves dumping memory and analyzing the content of memory at a point in time. In certain instances, such memory dumps may be performed after a malware causes a computer to crash or to perform another malicious act. Identifying the presence of malware in a data set by examining data included in a memory dump is much like sorting through heaps of forensic evidence that may or may not be related to malicious act. This is because at the time of the memory dump, memory would include data related to normal computer program activity and may include data associated with malware. A practitioner may have little to no ability to identify what data was necessarily normal or what data was associated with malware. In such instances a practitioner may not be aware of which instructions actually performed a malicious act. Hence we need a memory detection solution which can correctly identify the point at which the malicious code is available in memory for detection such that malicious acts can be observed as program code executes at run-time. What are also needed are detection methods and apparatus that analyze actions performed by malicious code while remaining unobserved (undetected) by the malicious code itself.

SUMMARY OF THE CLAIMED INVENTION

The presently claimed invention relates to a method, a non-transitory computer readable storage medium, or an apparatus executing functions consistent with the present disclosure for preventing malicious content from affecting the operation of a computer. A method consistent with the present disclosure may analyze a specific portion of program code from a data set to see if that specific portion of program code includes malware. The analysis performed based on that specific portion of program code being previously identified as being suspicious. The analysis of this portion of program code may include identifying that the suspected malware program code has been loaded into at least a portion of a memory for execution based on an identifier that indicates that this portion of the data set includes suspected malware program code and based on the at least the portion of the memory being marked as including executable code. The presently claimed method may also include preventing the suspect program code from being executed prior to the scanning of the suspect program code with a malicious code scanner, scanning the suspect program code with the malicious code scanner, identifying that the suspect program code matches a known set of malicious code, and performing a corrective action based on the suspect program code matching the known set of malicious code.

When the presently claimed invention is implemented as a non-transitory computer readable storage medium, a processor executing instructions out of a memory may analyze a specific portion of program code from a data set to see if that specific portion of program code includes malware. The analysis performed based on that specific portion of program code being previously identified as being suspicious. The analysis of this portion of program code may include identifying that the suspected malware program code has been loaded into at least a portion of a memory for execution based on an identifier that indicates that this portion of the data set includes suspected malware program code and based on the at least the portion of the memory being marked as including executable code. The presently claimed method may also include preventing the suspect program code from being executed prior to the scanning of the suspect program code with a malicious code scanner, scanning the suspect program code with the malicious code scanner, identifying that the suspect program code matches a known set of malicious code, and performing a corrective action based on the suspect program code matching the known set of malicious code.

An apparatus consistent with the present disclosure may include a processor that executes program code out of a memory. The processor when executing the program code may analyze a specific portion of program code from a data set to see if that specific portion of program code includes malware. The analysis performed based on that specific portion of program code being previously identified as being suspicious. The analysis of this portion of program code may include identifying that the suspected malware program code has been loaded into at least a portion of a memory for execution based on an identifier that indicates that this portion of the data set includes suspected malware program code and based on the at least the portion of the memory being marked as including executable code. The processor executing instructions out of the memory may also prevent the suspect program code from being executed prior to the scanning of the suspect program code with a malicious code scanner, scan the suspect program code with the malicious code scanner, identify that the suspect program code matches a known set of malicious code, and perform a corrective action based on the suspect program code matching the known set of malicious code.

DETAILED DESCRIPTION

Figure 1:
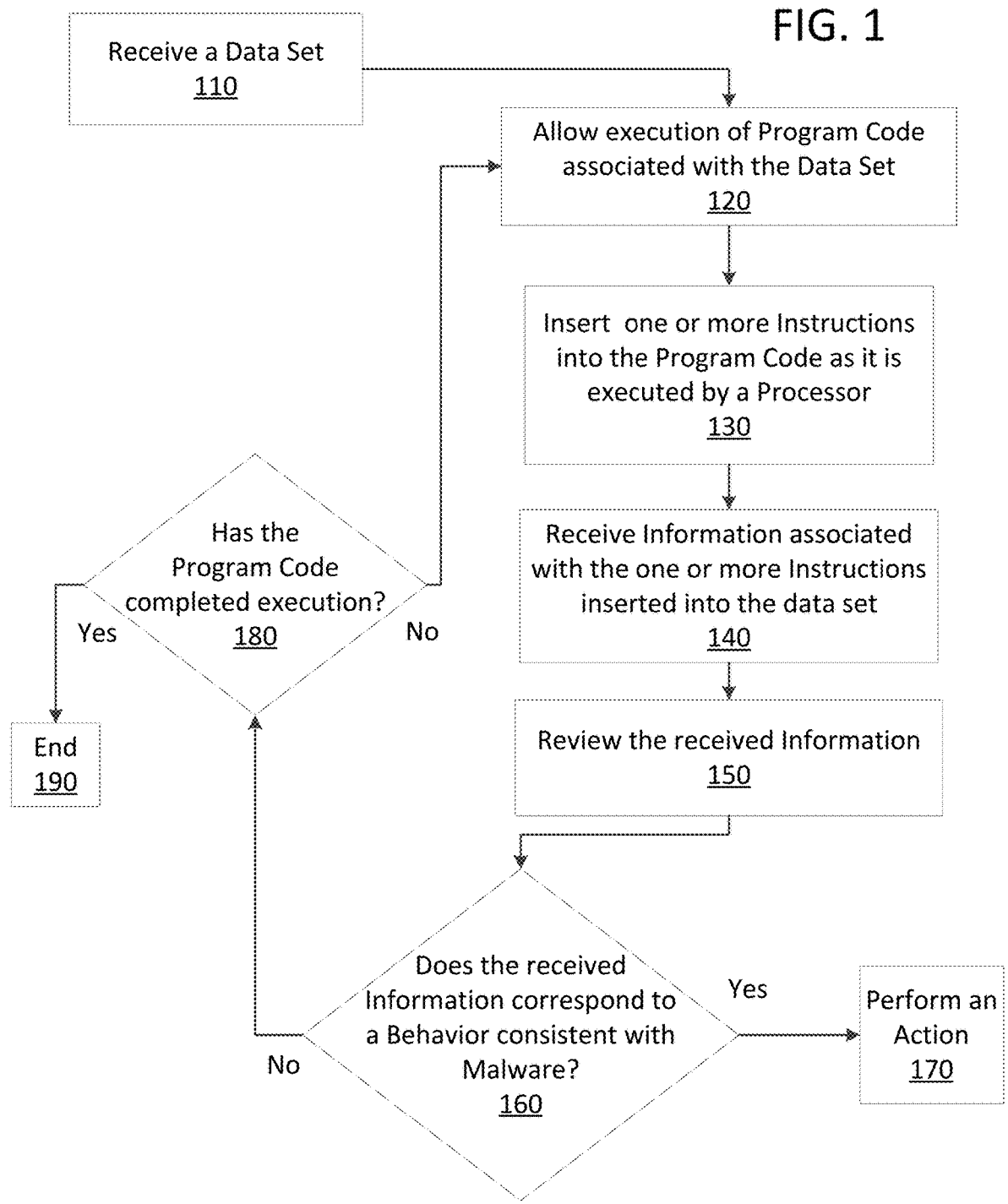
FIG. 1 illustrates a set of steps that may be performed by a Dynamic Binary Instrumentation (DBI) framework that analyzes the behavior of program code associated with a data set.

The present disclosure is directed to monitoring internal process memory of a computer at a time with program code executes. Methods and apparatus consistent with the present disclosure monitor the operation of program code (executable code) that may be associated with a file or have been received via data packets sent over a computer network. Malware may be detected by scanning suspect program code with a malware scanner, malware may be detected by identifying suspicious actions performed by a set of program code, or malware may be detected by a combination of such techniques.

The methods and apparatus consistent with the present disclosure may use a technique referred to as a dynamic binary instrumentation (DBI) framework or tool that is used to analyze a given set of computer data. Dynamic binary instrumentation (DBI) is a method of analyzing the behavior of a binary application at runtime through the injection of instrumentation code. This instrumentation code executes as part of the normal instruction stream after being injected. Rather than considering what may occur, dynamic binary analysis has the benefit of operating on what actually does occur. While not necessarily exhaustive in terms of exercising all code paths in an application, DBI provides detailed insight into an application's concrete execution state.

The instrumentation code can remain entirely transparent to an application that it's been injected into, the instrumentation code may be used to pass context information relating to the behavior of that software application as it executes in real-time. As such, processes performed by an application program may be monitored by a processor executing code that analyzes what the application program does by reviewing the context information passed from the instrumentation code. This context information includes, yet is not limited to the content of certain computer registers, parameters associated with a process performed by a processor executing code of the application, the content of certain memory locations, information that relates to the state of a memory, or information relating to the allocation of memory. Analysis of an application at runtime using binary instrumentation makes it possible to gain insight into the behavior of a particular application including internal CPU registers and memory state of the application throughout its execution. As such, the detection of malware by DBI highlights one of the key differences between DBI and conventional static binary analysis.

Note that program code may be associated with a different set of contextual information than a set of contextual information that is associated with analysis code that may be used to analyze the program code. As such, a set of program code may be associated with a first set of contextual information and analysis code may be associated with a second set of contextual information. These different sets of contextual information may be related to different distinct process of the program code and of a set analysis code. This may be true even when the analysis code analyzes the real-time execution of the program code. Analysis code consistent with the present disclosure may execute as a background task that is an independent process from a process associated with the execution of program code. In certain instances, this analysis code may poll memory associated with program code using techniques associated with a DBI framework. Alternatively or additionally analysis code may analyze data stored in memory by scanning the contents of memory with techniques associated with deep packet inspection (DPI). As such, analysis software may identify malicious or suspicious code via instrumentation code that matches program code contexts to criteria that is associated with suspicious code. Furthermore, analysis software may identify malicious code by matching signatures associated with known malware with data stored in memory.

When malware binaries contain encrypted or obfuscated code that unpacks itself into memory during execution before their malicious code is executed, the operation of unpacking the malware may include sending requests to the operating system to allocate additional memory or may include the use pre-allocated memory that is available on an executable process image loaded into memory. The newly allocated memory or the pre-allocated memory may include one or more memory pages that are or were allocated as part of a single memory allocation region. When computer data is loaded into a particular memory region, information relating to the use of that memory may be collected or observed by observation code consistent with the present disclosure. Typically, when memory is loaded with computer data, an operating system (OS) loader is invoked to actually perform the function of loading memory with that computer data. OS loaders are used to load executable programs, computer library data, or other data into memory. As such, the loading of data into a region of memory may be associated with one or more states that may be used by observation code as that computer data is evaluated for the presence of malware. States that may be consistent with the presence of malware may include the writing to a particular memory region by a particular compute process, an association of a particular compute process with a particular set of computer data, the invocation of an OS program loader, or the invocation of another OS function or command.

When malware that includes obfuscated or encrypted code, data may then be written to a newly allocated or previously allocated memory region. In certain instances, program code that includes obfuscated malware may first move or copy the obfuscated malware code and data into a memory location, where a processor executing that program code may de-obfuscate obfuscated malware before that malware is executed by the processor. Alternatively or additionally, program code that includes obfuscated malware may move or copy the malware related data to the memory as part of a de-obfuscation logical process. De-obfuscated malware may also be written to a particular memory region after the obfuscated malware has been de-obfuscated. Ultimately, the goal of computer hackers is to insert a Trojan (malicious code) into memory of a computing device where it can be executed as that Trojan performs an intended malicious activity.

Using a DBI framework, inserted program code can be used identify that a memory region is currently being allocated. The inserted program code may also access to information relating to all a set of pre-allocated memory that is associated with a certain computer process or set of computer data. As such, the DBI framework maintains visibility on memory regions as they are being written to. The DBI framework may also be aware of a current code execution path. All of this information may be used to identify that a particular memory region is being accessed that was previously written to. In an instance where a memory region has been overwritten since the region has been allocated to a particular process and consequently that same memory region is where the current code execution path reaches, then program code associated with the DBI framework can identify that dynamically unpacked code is being executed. In certain instances, the program code of the DBI framework may associate a set of computer data as being suspect of including malware after which data stored in the associated memory region can then be dumped as a file on disk for further analysis using known pattern matching techniques.

Methods and apparatus consistent with the present disclosure herein may also prepare data included in a set or stream of data packets for evaluations that may identify whether the malware is included in the data packet set.

The de-obfuscating of a set of computer data may include decrypting, reordering, or resequencing data included in that set of computer data. In certain instances, a portion of the data included in the set of computer data may be decrypted. The decryption may include XORing at least a portion of the data included in the data packet set with other data or with other data included in the data packet set. The decryption of the computer data may be associated with the possible presence of malware in that data set. As such, the XORing of data in a set of computer may cause a computer data set to be classified as possible malware.

An Example of reordering/resequencing received data includes reorganizing received data according to an interleaving process that reshuffles data or commands. Such a process is similar to shuffling a deck of cards where each card is equivalent to one or more data bits/bytes. In such instances, data from different portions of a data packet or from different packets sent between computers or data from a file may be reorganized forming an executable data set that may include malware. To accomplish this, code included in one or more data packets or in a file may include instructions for reordering data included in the data set after it is received. The execution of those instructions may generate malicious code from data that has intentionally been obfuscated to prevent a deep packet inspection (DPI) engine from detecting malware hidden within the data packet set.

The analysis of the data in the data packets may include executing program code included in the data packets and monitoring the execution of that program code when watching for unauthorized or suspicious actions performed by the program code. Unauthorized actions include, yet are not limited to writing to a boot block, updating a system registry, making changes to the file system, deleting computer data, copying data, transmitting data to another computer, or intercepting calls to a set of basic input/output instructions (BIOS) of a computer executing that program code. The intercepting of BIOS calls by the program code may be identified by observing program code replacing an original BIOS related command with another command or by observing that program code modifying parameters that were included in the original BIOS related command before the original BIOS command can be executed. As such, the analysis function may execute program code for the destination computer using a "Sandboxing" technique, thus allowing the program code to be evaluated for malware in a secure environment. In certain instances, methods and apparatus consistent with the present disclosure may combine "Sandboxing" with deep packet inspection (DPI). Once malware has been identified, signatures may be generated from the packet data for future use by processors that perform a DPI function. Sandboxing and DPI may be performed in parallel, thus detecting malware that has not been previously identified may be identified by a "Sandboxing" technique or detecting malware that has been previously identified may be identified via matching DPI techniques.

The analysis of data included in the data packet set may also observe the execution of program code and identify that the executed program code performs a function relating to organizing further instructions for execution from data included in the plurality of data packets. Once observed, this analysis may then classify this reorganization of data as an unauthorized action after which the data packet set or program code may be blocked or sequestered. As such, content included in a data set may be classified as malware based on how or what functions program code within that data set are performed.

Determinations relating to the identification of malware may also be based on a set of rules that identify what program behaviors are authorized or that are unauthorized. For example, a rule may be used to classify data within a data set as malware whenever data within that data set is reorganized/reshuffled or when data within that data set is manipulated or de-obfuscated by an XOR function. Alternatively another rule may indicate that the decryption of packet data is acceptable as long as it is performed in a manner consistent with a standard or expected type of decryption (such as decryption associated with a TCP communication). This other rule may also indicate that further analysis of program data is required after the decryption has been performed.

Even in instances where the reorganization of data is observed, methods consistent with the present disclosure may include continuing the analysis of program code included in a data packet set with the intent of identifying whether that program code performs malicious actions and what malicious acts it does perform. Furthermore, signatures may be generated from the reorganized data for later use by a deep packet inspection (DPI) engine, for example.

FIG. 1 illustrates a set of steps that may be performed by a Dynamic Binary Instrumentation (DBI) framework that analyzes the behavior of program code associated with a data set. In step 110, a set of data may be received by a computing device. That set of data may have been received via packet communication, than has been retrieved from a data storage, or that may have been received by other means. After step 110, program flow move to step 120 where program code associated with the received data set is allowed to be executed, for example, by a processor executing instructions out of a memory. Next in step 130 of FIG. 1, one or more instructions may be inserted into the program code as it is executed by a processor. These instructions may be inserted either in random locations or may be inserted based on activities or access patterns associated with the program code. For example, when certain Operating System functions or certain types of instructions are initiated or are completed. Like hitting a breakpoint set in a computer emulator, the DBI framework can trigger an action based on commands initiated or executed by a processor. Once the DBI framework identifies an event, it may insert an instruction and then collect and report information related to that instruction to the DBI framework in between individual instructions of the program code being analyzed. This process can be transparent to the program code, as it may occur without processes associated with the program code receiving information relating to the inserted commands.

Then in step 140 of FIG. 1, information relating to the inserted instructions may be received and that received information may be reviewed in step 150 of FIG. 1. Determination step 160 then identifies whether the received information corresponds to a behavior that may be consistent with malware. As such, step 150 may identify that the program code is suspect, identify that the program code is malware, or identify that the program code does not appear to be malware. When determination step 160 identifies that the behavior of the program code may be consistent with malware or is malware, program flow moves to step 170 where an action is performed. Actions that mat be performed at step 170 include, yet are not limited to sequestering the data set, saving the data set for future analysis, sending the data set to another computing device for analysis, or dumping/deleting the data set. Sequestering the data set may include storing the data set in a location that is associated with suspected malicious code. For example, a data set may be stored in a directory used to store only suspected malicious code or that data set may be sent to an external computing device for storage and further analysis.

As such, corrective actions that may be performed after a data set has been identified as possibly including malicious code include, yet are not limited to storing the data set in a storage location associated with a classification indicating that the data set possibly includes malicious code and/or modifying the data set to include the classification and storing the modified data set, where that modification of the data set may include adding the classification to metadata associated with the data set. Alternatively or additionally such corrective actions may include: performing a function that modifies the data set, the modification of the data set by the function, thereby disables the executable code included in the data set, and storing the modified data set. In certain instances a processor associated with analyzing a data set may receive a data set that has been modified to prevent execution of program code in that data set, enable the executable code included in the data set by reversing a function that disabled the executable code, execute instructions associated with that data set, and monitors activity performed by the one or more executable code instructions.

In certain instances a data set that includes suspected malicious code may be modified, for example by adding metadata information that identifies the data set as possibly being malicious.

In other instances, suspected data sets may be modified in a manner that renders program code in the data set inactive. For example, an instruction could be added to the data set that causes program code in the data set to be bypassed using a jump instruction that causes program execution to jump from an initial command to the end of a program. In instances where program code is modified in a manner that renders it inactive, the data set may be sent to another computer for further analysis. This other computer may then remove the jump instruction and run the program code when performing further analysis. For this other computer to be able to reactivate an executable program that has been deactivated by a first computer, a program executing at this other computer may use information that has been shared between or known by both of these computers.

When determination step 160 identifies that the program code does not appear to be consistent with malware, program flow moves to determination step 180 that identifies whether the program code has completed. When the program code has completed, the flow chart of FIG. 1 ends at step 190. When determination step 180 identifies that the program code has not completed, program flow moves back to step 120 where the program code is once again allowed to execute.

Figure 2:
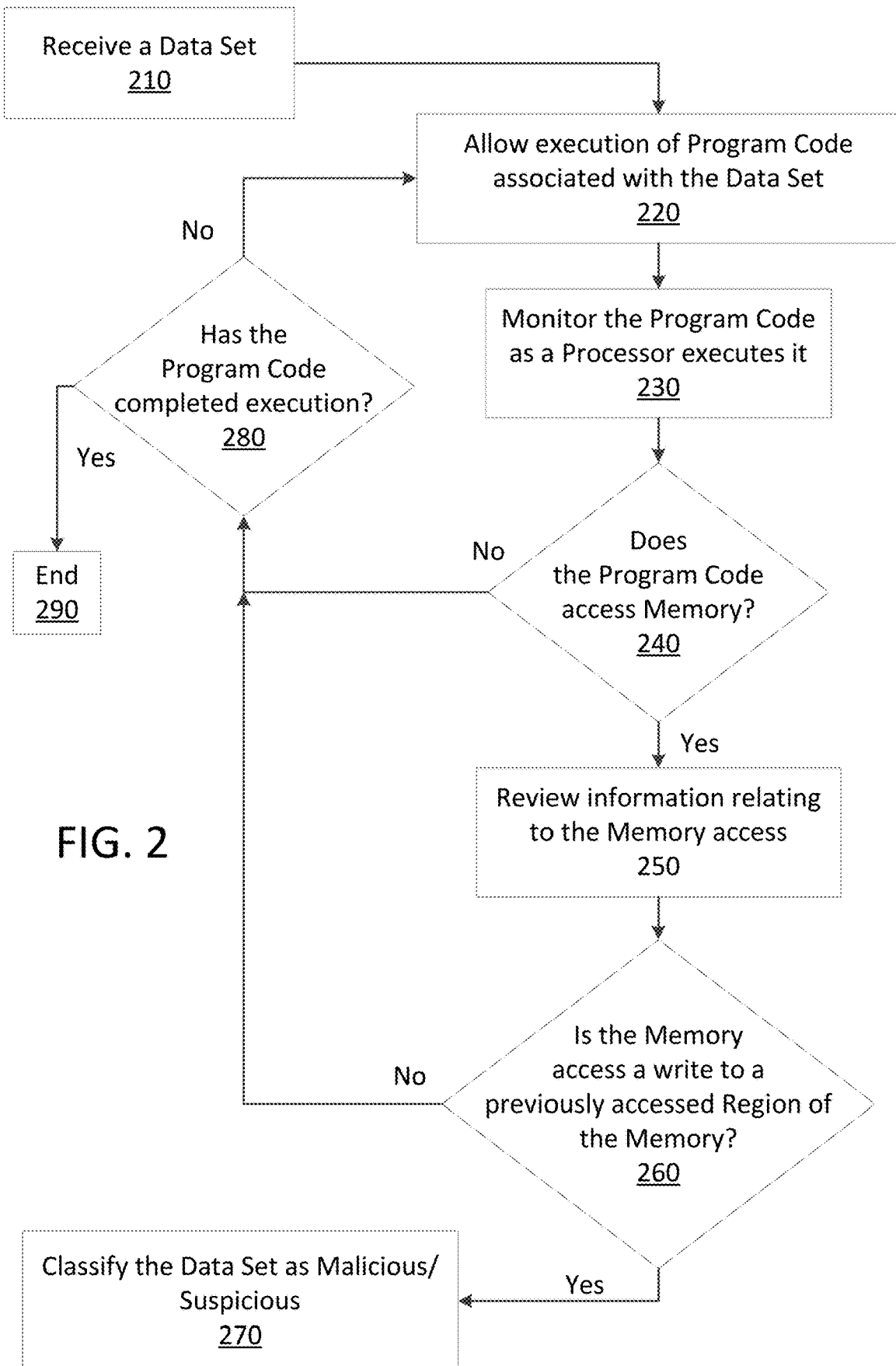
FIG. 2 illustrates a set of steps that identifies a memory access pattern that may be associated with malicious program code.

FIG. 2 illustrates a set of steps that identifies a memory access pattern that may be associated with malicious program code. FIG. 2 begins with step 210 that receives a data set, next program code associated with that data set is allowed to execute in step 220 of FIG. 2. After step 220, step 230 monitors the program code as it executes. Determination step 240 then identifies whether the operation of the program code accessed memory. This memory access may relate to allocating memory, reading from a memory, or writing to a memory. When step 240 identifies that the program code has accessed memory, program flow moves to step 250 where information relating to that memory access is reviewed. This review may correlate information related to the memory allocation with one or more reads or writes to that allocated memory. The review may correlate information related to a multiple writes to a location in or a region of memory.

After step 250, determination step 260 identifies whether this memory access is a write to a previously accessed location or region of the memory. When determination step 260 identifies that the memory access accesses a location that has been previously accessed by the program code, that program code may be classified as malicious or suspicious in step 270 of FIG. 2. This determination may be made based on data stored in memory matching a predifed criteria or pattern. For example, memory content may be matched to criteria that associates suspicious events to a suspicious criteria using DBI techniques when identifying suspicious code. Alternatively or additionally, memory content may be identified as being malicious when scanned memory content matches signatures of known malicious code. Step 270 may identify a portion (or area of program code) of the data set received in step 210 is malicious or suspicious such that methods consistent with the present disclosure may focus on analyzing program code included in the identified portion/area of suspicious program code when that program code is further analyzed.

The program flow of FIG. 2 may flow from step 240 to step 280 when determination step 240 identifies that the program code does not access the memory. Program flow also flows from step 260 to step 280 when determination step 260 identifies that the memory access is not related to a previously accessed memory location or region. Determination step 280 then identifies whether the program code has completed. When the program code has completed, the flow chart of FIG. 2 ends at step 290. When determination step 280 identifies that the program code has not completed, program flow moves back to step 220 where the program code is once again allowed to execute.

Figure 3:
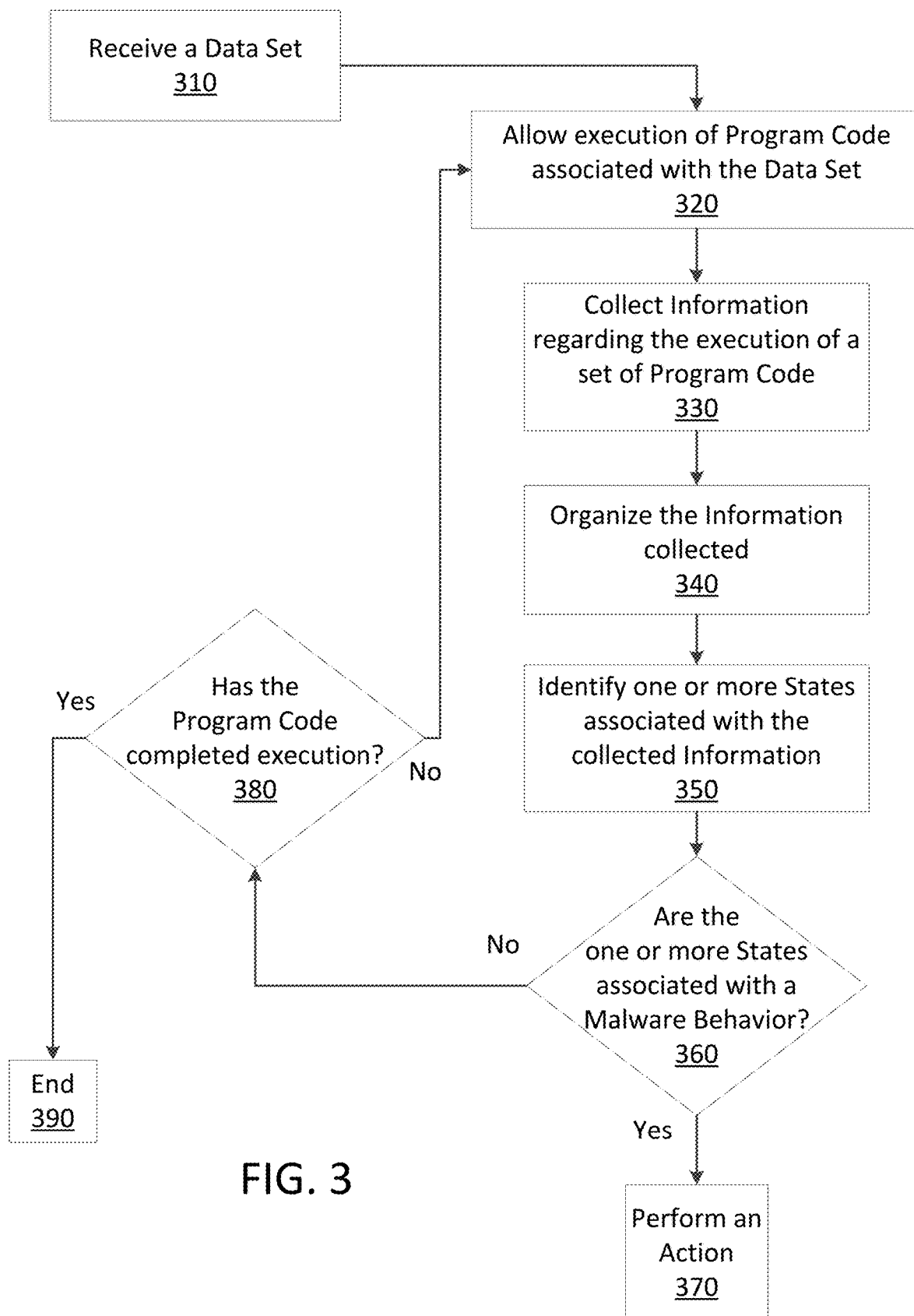
FIG. 3 illustrates a series of steps where executable code is observed while it is executed by a processor.

FIG. 3 illustrates a series of steps where executable code is observed while it is executed by a processor. FIG. 3 begins with step 310 where a data set is received, next in step 320 program code associated with that data set is allowed to execute. Step 330 of FIG. 3 is where information relating to the executed program code is collected. The information collected in step 330 may include context information that relates to the behavior of that software application as it executes in real-time. This context information may include the content of certain computer registers, parameters associated with a process performed by a processor executing code of the application, the content of certain memory locations, information that relates to the state of memory, information relating to the allocation of memory, or the initiation or completion of an operating system call or operation.

After information is collected in step 330, that information may be organized in step 340 of FIG. 3. The organization of collected information may store that collected information based on a classification. For example, the invocation of an operating system loader may be stored with a classification of a command associated with loading a program into memory. Next, in step 350 one or more states associated with the collected information may be identified. As such, step 350 may identify states associated with allocating memory, states relating to accessing memory, or states associated with writing different operating system calls. Alternatively or additionally states that may be associated with malware may include collecting information from a computing device and preparing that information to be sent to another computing device, may include initiating a write to a system registry, or may include initiating a write to a system area on a disk drive.

After step 360 determination step 360 may determine whether the states identified in step 350 appear to be related to malware. When determination step 360 identifies that the states identified in step 350 appear to be related to malware, program flow may move from step 360 to step 370 where an action may be performed. Here again, Actions that may be performed include, yet are not limited to sequestering the data set, saving the data set for future analysis, sending the data set to another computing device for analysis, or dumping/deleting the data set.

When determination step 370 identifies that the identified states appear not to be related to malware, program flow may move from step 360 to determination step 380 that identifies whether the program code has completed execution, when no program flow may move from step 380 back to step 320 where the program code is allowed to continue executing. When determination step 380 identifies that the program code has completed, program flow will move from step 380 to step 390 where the flow chart of FIG. 3 ends.

Figure 4:
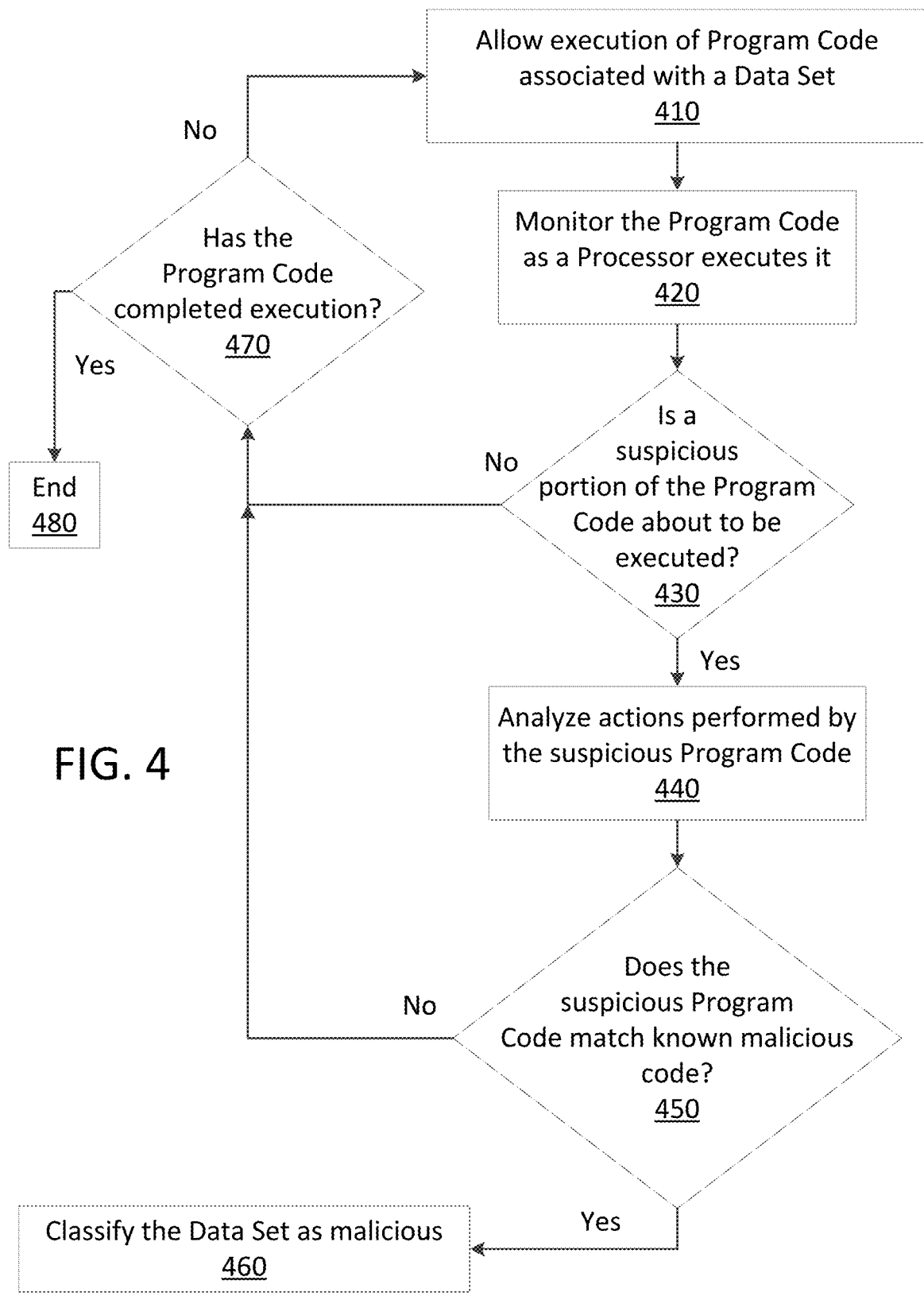
FIG. 4 illustrates an instance where the analysis of program code in a received data set is focused on a portion of program code of a data set that may have been classified as being suspicious by operations of the flow chart of FIG. 2.

FIG. 4 illustrates an instance where the analysis of program code in a received data set is focused on a portion of program code of a data set that may have been classified as being suspicious by operations of the flow chart of FIG. 2. Step 410 of FIG. 4 allows a received data set to be executed. After step 410, step 420 may monitor the execution of program code in that data set as it executes. This monitoring may include looking for indicators that indicate that a particular portion of program code in the data set has been previously identified as being suspicious. In certain instances step 420 of FIG. 4 may be executed after step 270 of FIG. 2 has classified this portion of the data set as being suspicious.

Determination step 430 of FIG. 2 may then identify whether the suspicious portion of the data set is about to be executed, when yes, program flow may from step 430 to step 440 where the suspect program code may be analyzed. The analysis of the program code may include matching that program code to known malicious code. This matching may include techniques associated with deep packet inspection (DPI). Because of this malicious code in a data set may be identified without allowing suspect program code to execute. Alternatively or additionally the identification that the data set include malicious code may include matching an action performed by the program code with one or more actions that are known or are believed to be malicious.

The identification that suspect malicious program code is about to be executed or that suspect malicious code is included in a data set may include identifying that a portion of program code has been marked as being executable. As such, when program code of a data set loads a portion of memory with information/data and then marks that information/data as being executable may in itself constitute suspicious program activity. When such program code has previously been associated with suspicious activity based on memory accesses like those described in respect to FIG. 2, that program code may be associated with both a first and a second suspiciousness level.

After step 440, determination step 450 identifies whether the portion of program code matches known malicious code, when yes, program flow moves from step 450 to step 460 where that data set may be classified as being malicious. While not illustrated in FIG. 4 data sets classified as being malicious may be deleted, quarantined, or be analyzed further.

As previously mentioned program code may be associated with a different set of contextual information than a set of contextual information that is associated with analysis code that may be used to analyze the program code. As such, a set of program code may be associated with a first set of contextual information and analysis code may be associated with a second set of contextual information. These different sets of contextual information may be related to different distinct process of the program code and of a set analysis code. This may be true even when the analysis code analyzes the real-time execution of the program code. Analysis code consistent with the present disclosure may execute as a background task that is an independent process from a process associated with the execution of program code. In certain instances, this analysis code may poll memory associated with program code using techniques associated with a DBI framework. Alternatively or additionally analysis code may analyze data stored in memory by scanning the contents of memory with techniques associated with deep packet inspection (DPI). As such, analysis software may identify malicious or suspicious code via instrumentation code that matches program code contexts to criteria that is associated with suspicious code. Furthermore, analysis software may identify malicious code by matching signatures associated with known malware with data stored in memory. Based on this, determination steps 430 and/or 450 may identify suspicious and/or malicious code using techniques consistent with DBI and/or with DPI.

When determination step 450 identifies that the suspicious program code does not appear to match known malicious code, program flow moves from step 450 to step 470. Step 470 may the determine whether program code associated with the data set has completed, when yes program flow moves to step 480 where the flow chart of FIG. 4 ends. When determination step identifies that the program codes in the data set has not completed execution, program flow moves back to step 410 where the program code is allowed to continue executing.

Figure 5:
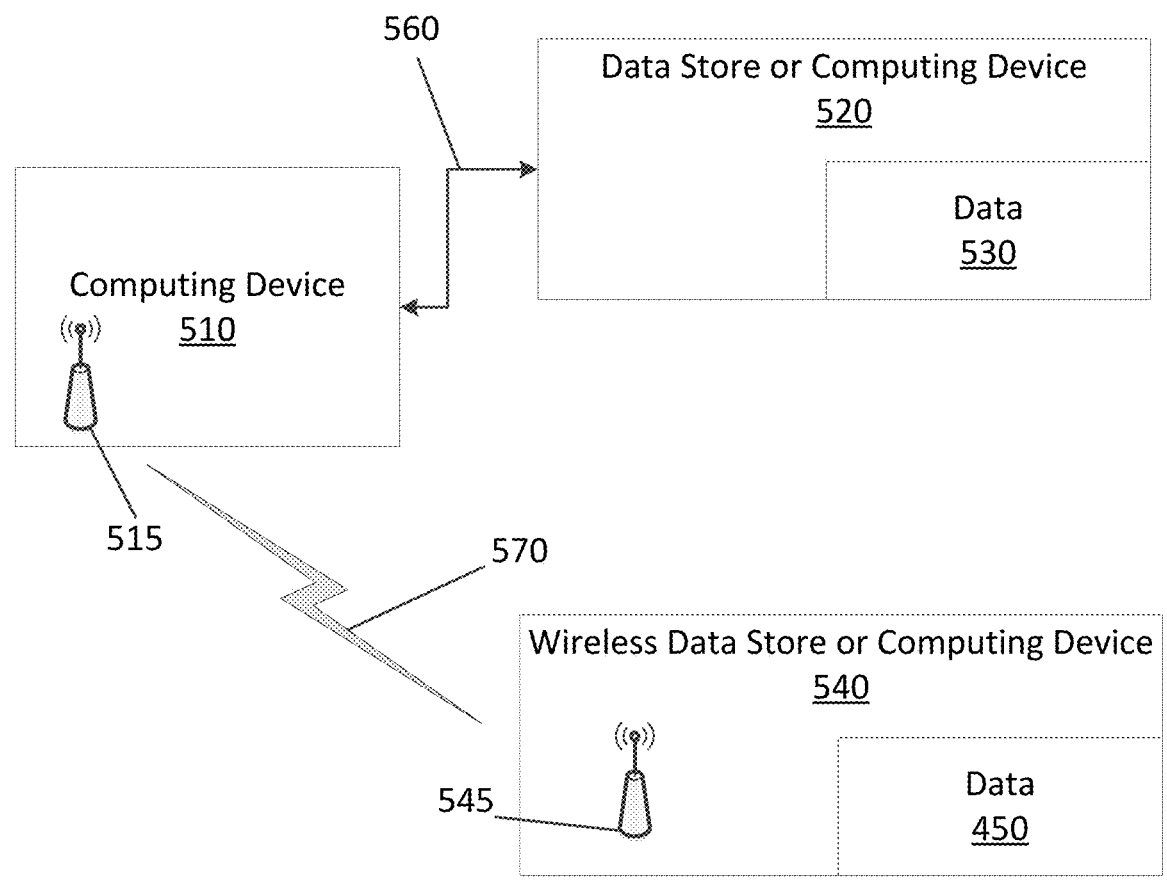
FIG. 5 illustrates a computing device accessing data at stored at a data store or at a computing device.

FIG. 5 illustrates a computing device accessing data at stored at a data store or at a computing device. FIG. 5 includes computing device 510, data store/computing device 520, and wireless data store/computing device 540. Data store/computing device 520 includes data 530 that computing device 510 may access via communication connection 560. Data store/computing device 540 includes data 550 that computing device 510 may access via wireless interconnect 515, wireless signal 570, and wireless interconnect 545 at the wireless data store/computing device. Computing device 510 may be a computer that actually retrieves data 540/550 or computing device 510 may be a firewall or gateway that retrieves data 540/550 for another computing device. Methods consistent with the present disclosure may be performed by any type of computing device 510 including, yet not limited to a personal computer, a notebook computer, a phone, a firewall, a gateway or other device. In certain instances after a data set is flagged as possibly being associated with malware, the data set and other information may be sent to another computer for further analysis. As such, computing devices may identify suspicious code without allowing that code to complete executing locally, thus protecting computing devices from the devastating effects of malware.

As such, processes performed by a program may be monitored by a processor executing code that analyzes what the application program does by reviewing the context information passed from the instrumentation code. This context information includes, yet is not limited to the content of certain computer registers, parameters associated with a process performed by a processor executing code of the program, the content of certain memory locations, information that relates to the state of a memory, or information relating to the allocation of memory. Analysis of an application at runtime using binary instrumentation makes it possible to gain insight into the behavior of a particular program including internal CPU registers and memory state of the program throughout its execution. As such, the detection of malware by DBI highlights one of the key differences between DBI and conventional static binary analysis.

Note that the systems and methods consistent with the present disclosure may identify the presence of malware loaded into executable memory without requiring suspect portions of code to be executed. Alternatively or additionally, program code can be executed while it is monitored to see if that program code actually does perform a malicious action. In an instance when an area of program code has been identified as possibly including malicious code, that suspect area of program code may be scanned as soon as it is loaded into executable memory. For example, the execution of program code may be interrupted (paused) while the content of that program code is scanned for malicious content. The scanning of suspect program code may be performed by any technique known in the art, including, yet not limited to techniques associated with DPI. Method and systems consistent with the present disclosure, therefore, may allow data sets to be analyzed more quickly for malicious code as portions of program code may be executed without all of the bytes of the program code to be scanned for malware. Instead, only certain portions of program code in a data set may be scanned by a malware scanning engine. As such, malware scanning techniques like DPI may be combined with instrumentation code that observes the actions of program code to see whether that program code performs a malicious act.

Figure 6:
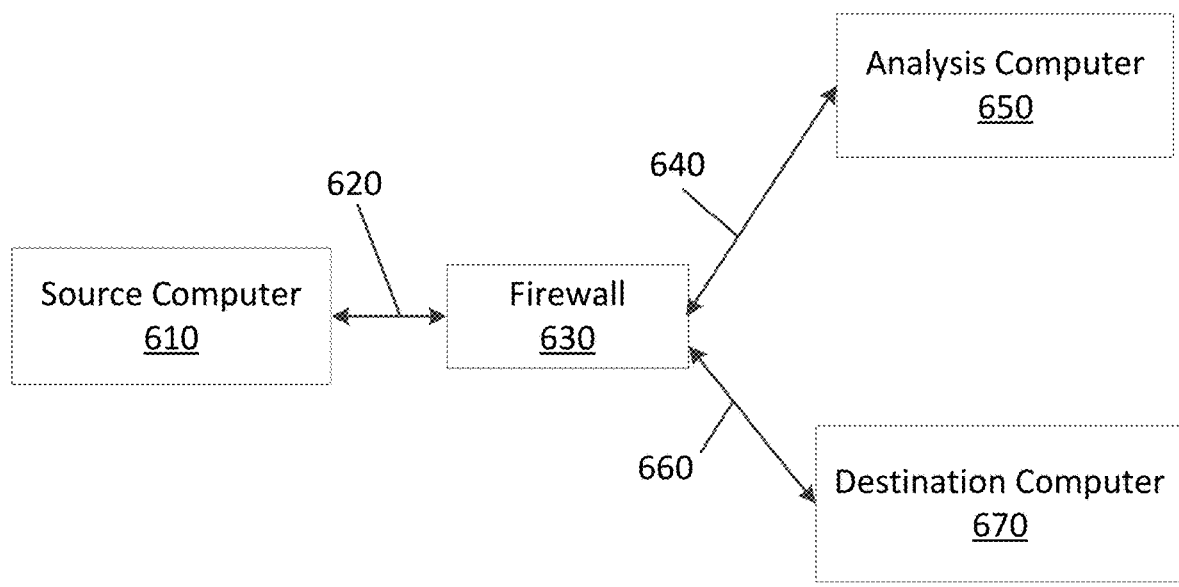
FIG. 6 illustrates a firewall communicating with an analysis computer when data packets sent from a source computer are received by and sent from the firewall.

FIG. 6 illustrates a firewall communicating with an analysis computer when data packets sent from a source computer are received by and sent from the firewall. In instances where potential malware can be received in packetized data communications, one or more computing devices may perform functions relating to identifying whether a data packet set includes malware. FIG. 6 includes a source computer 610, a firewall 630, an analysis computer 650, and a destination computer 670 that may prevent malware from reaching the destination computer. FIG. 6 also includes communications 620 sent to/from the destination computer 670 via firewall 630, communications 660 sent to/from the destination computer 670, and communications 650 sent between the firewall 630 and the analysis computer 650. Note that communications 620 may be transmitted over a computer network such as the Internet, that communications 660 may be sent over computer network interfaces at the firewall 630 and at the destination computer 660, and that communications 640 may be sent between the firewall and the analysis computer via computer network interfaces at the firewall 630 and the analysis computer 650. Note also that any of the computer networks over which communications 620, 640, and 660 are sent may include wired or wireless network interfaces. Analysis computer 650 may also be remote from firewall 630 and analysis computer 650 may reside in the Cloud. Network interfaces associated with the present disclosure may include any form of wired or wireless network interface known in the art.

The various components of FIG. 6 may implement functions associated with the receipt and analysis of computer data that may have been requested by destination computer 670 and have been provided by source computer 610. In such instances, firewall 630 and analysis computer 650 may perform functions consistent with receiving packets, providing messages, or analyzing computer data sent from source computer 610 when identifying whether the requested downloaded data includes malicious content. As such firewall 630 and analysis computer 650 may perform functions consistent with the present disclosure, including those functions described in respect to FIGS. 1-4.

Figure 7:
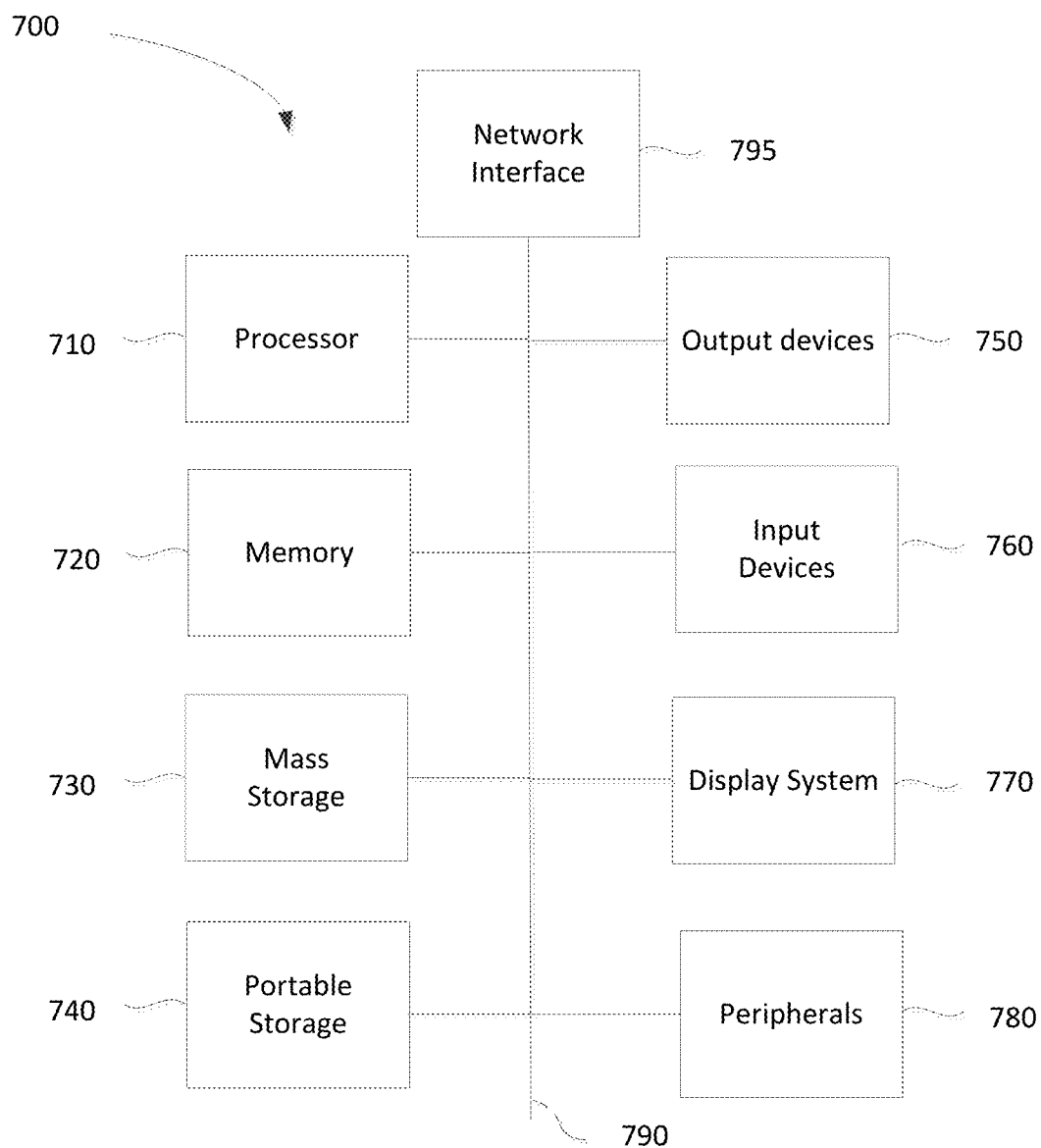
FIG. 7 illustrates a computing system that may be used to implement an embodiment of the present invention.

FIG. 7 illustrates a computing system that may be used to implement an embodiment of the present invention. The computing system 700 of FIG. 7 includes one or more processors 710 and main memory 720. Main memory 720 stores, in part, instructions and data for execution by processor 710. Main memory 720 can store the executable code when in operation. The system 700 of FIG. 7 further includes a mass storage device 730, portable storage medium drive(s) 740, output devices 750, user input devices 760, a graphics display 770, peripheral devices 780, and network interface 795.

The components shown in FIG. 7 are depicted as being connected via a single bus 790. However, the components may be connected through one or more data transport means. For example, processor unit 710 and main memory 720 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing embodiments of the present invention for purposes of loading that software into main memory 720.

Portable storage device 740 operates in conjunction with a portable non-volatile storage medium, such as a FLASH memory, compact disk or Digital video disc, to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, or a pointing device, such as a mouse, a trackball, stylus, or cursor direction keys. Additionally, the system 700 as shown in FIG. 7 includes output devices 750. Examples of suitable output devices include speakers, printers, network interfaces, and monitors.

Display system 770 may include a liquid crystal display (LCD), a plasma display, an organic light-emitting diode (OLED) display, an electronic ink display, a projector-based display, a holographic display, or another suitable display device. Display system 770 receives textual and graphical information, and processes the information for output to the display device. The display system 770 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 780 may include any type of computer support device to add additional functionality to the computer system. For example, peripheral device(s) 780 may include a modem or a router.

Network interface 795 may include any form of computer interface of a computer, whether that be a wired network or a wireless interface. As such, network interface 795 may be an Ethernet network interface, a BlueTooth™ wireless interface, an 802.11 interface, or a cellular phone interface.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 700 may in some cases be a virtual computer system executed by another computer system. Various operating systems can be used including Unix, Linux, Windows, Macintosh OS, Palm OS, Android, iOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, FLASH memory, a flexible disk, a hard disk, magnetic tape, any other magnetic medium, a CD-ROM disk, digital video disk (DVD), any other optical medium, RAM, PROM, EPROM, a FLASH EPROM, and any other memory chip or cartridge.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASH EPROM, and any other memory chip or cartridge.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for identifying malware based on an analysis of dynamic binary instrumentation (DBI) framework state information, the method comprising:
receiving program code included in a data set after a first processor has added an identifier to metadata of the data set indicating that the program code in the data set is suspected of being malware, wherein the program code is rendered inactive by way of inserting one or more instructions into the program code that result in jumping from an initial command in the program code to an end of the program code;
identifying that the metadata of the data set includes the malware program code identifier;
rendering the program code active by removing the one or more instructions;
loading the program code and a set of observation instructions of a DBI framework into at least a portion of a memory for execution;
observing one or more actions performed during the execution of the program code that was loaded in the portion of the memory by executing the set of observation instructions of the DBI framework;
associating the one or more actions with the DBI framework state information;
identifying that the program code is malicious based on an identification that the DBI framework state information corresponds to a malicious program code behavior based on allocation of additional memory by the program code; and
performing a corrective action based on the identification that the program code is malicious.

2. The method of claim 1, wherein the first processor executes instructions to:
identify that the data set includes the program code;
allow instructions of the program code to be executed out of the memory by a processor;
insert one or more observation instructions of the set of observation instructions between the program code instructions;
analyze data associated with the one or more observation instructions, wherein the program code is identified as having performed a suspicious activity;
classify the data set as possibly including the malicious program code based on the identified suspicious activity; and
perform at least one action based on the classification.

3. The method of claim 2, wherein the at least one action includes modifying the data set to include the classification and storing the modified data set.

4. The method of claim 3, wherein the modification of the data set includes adding the classification to the metadata of the data set.

5. The method of claim 2, wherein the first processor is located at a first computer system that is physically separate from a second computer that receives the program code included in the data set.

6. The method of claim 1, further comprising executing additional instructions by a virtual set of operating system software.

7. The method of claim 2, wherein the at least one action includes sending the data set to another computer for further analysis.

8. The method of claim 1, further comprising monitoring the program code via a background process that polls memory locations separate from a main execution path of the program code.

9. The method of claim 1, further comprising associating the portion of the memory with a first set of contextual information and associating a set of analysis code with a second set of contextual information.

10. The method of claim 1, further comprising executing one or more instructions included in the set of observation instructions, wherein execution of the one or more observation instructions generates observation information regarding the program code.

11. The method of claim 10, further comprising identifying that the observation information includes at least one of content of a register, a program code process parameter, content of one or more specified memory locations, memory state data, or memory allocation data.

12. The method of claim 10, further comprising identifying from the observation information that at least one operating system (OS) loader instruction has been executed to load data into the portion of the memory.

13. The method of claim 10, further comprising identifying from the observation information that the program code has been loaded into the portion of the memory.

14. The method of claim 10, further comprising identifying from the observation information that data included in the program code has been decrypted.

15. The method of claim 10, further comprising identifying from the observation information that data included in the program code has been reordered.

16. The method of claim 10, further comprising identifying from the observation information that a boot block has been written to.

17. The method of claim 10, further comprising identifying from the observation information that a system registry has been updated.

18. The method of claim 10, further comprising identifying from the observation information that file system data has been changed.

19. The method of claim 1, wherein the first processor is located at a firewall and the suspect program code is rendered active by a second processor located at an analysis computer.

20. A non-transitory computer-readable storage medium, having embodied thereon a program executable by a processor for implementing a method for identifying that malware based on an analysis of dynamic binary instrumentation (DBI) framework state information the method comprising:
receiving program code included in a data set after a first processor has added an identifier to metadata of the data set indicating that the program code in the data set is suspected of being malware, wherein the program code is rendered inactive by way of inserting one or more instructions into the program code that result in jumping from an initial command in the program code to an end of the program code;

identifying that the metadata of the data set includes the malware program code identifier;

rendering the program code active by removing the one or more instructions;

loading the program code and a set of observation instructions of a DBI framework into at least a portion of a memory for execution;

observing one or more actions performed during the execution of the program code that was loaded in the portion of the memory by executing the set of observation instructions of the DBI framework;

associating the one or more actions with the DBI framework state information;

identifying that the program code is malicious based on an identification that the DBI framework state information corresponds to a malicious program code behavior based on allocation of additional memory by the program code; and performing a corrective action based on the identification that the program code is malicious.

21. An apparatus for identifying malware based on an analysis of dynamic binary instrumentation (DBI) framework state information, the apparatus comprising:

a memory;

a network interface that receives program code included in a data set after an identifier has been added to metadata of the data set, the identifier indicating that the program code is suspected of being malware, wherein the program code has been rendered inactive by inserting one or more instructions into the program code that result in jumping from an initial command in the program code to an end of the program code; and a hardware processor that executes instructions out of the memory, wherein the processor executes the instructions to:

identify that the metadata of the data set includes the malware program code identifier, render the program code active by removing the one or more instructions, load the program code and a set of observation instructions of a DBI framework into at least a portion of a memory for execution, observe one or more actions performed during the execution of the program code that was loaded in the portion of the memory by executing the set of observation instructions, associate the one or more actions with the DBI framework state information, identify that the program code is malicious based on an identification that the DBI framework state information corresponds to a malicious program code behavior based on allocation of additional memory by the program code; and perform a corrective action based on the identification that the program code is malicious.

* * * * *